United States Patent
Perben et al.

(10) Patent No.: US 7,374,088 B2
(45) Date of Patent: May 20, 2008

(54) PORTABLE READER

(75) Inventors: Cédric Perben, Ingre (FR); Delphine Begassat, Montrouge (FR); Bruno Blanchard, Saint-Cloud (FR); Tim Lloyd, Wokingham (GB); Jean-Claude Perrin, Saint-Cloud (FR)

(73) Assignee: AXALTO S.A., Montrouge (FR)

( * ) Notice: Subject to any disclaimer, the term of this patent is extended or adjusted under 35 U.S.C. 154(b) by 179 days.

(21) Appl. No.: 10/530,962

(22) PCT Filed: Oct. 10, 2003

(86) PCT No.: PCT/IB03/04479

§ 371 (c)(1),
(2), (4) Date: Oct. 13, 2005

(87) PCT Pub. No.: WO2004/034308

PCT Pub. Date: Apr. 22, 2004

(65) Prior Publication Data

US 2006/0097050 A1 May 11, 2006

(30) Foreign Application Priority Data

Oct. 11, 2002 (EP) .................................. 02292506

(51) Int. Cl.
*G06K 7/06* (2006.01)
(52) U.S. Cl. .................... 235/441; 439/159; 439/326; 439/629; 439/630; 439/632
(58) Field of Classification Search ................ 235/441; 439/326, 629, 630, 632, 159
See application file for complete search history.

(56) References Cited

U.S. PATENT DOCUMENTS

| | | | | |
|---|---|---|---|---|
| 5,603,629 | A | * | 2/1997 | DeFrasne et al. ........... 439/331 |
| 6,015,092 | A | | 1/2000 | Postlewaite et al. |
| 6,070,797 | A | * | 6/2000 | Vandenengel ............... 235/441 |
| 6,149,450 | A | * | 11/2000 | Gastineau ................... 439/325 |
| 6,210,193 | B1 | * | 4/2001 | Ito et al. ..................... 439/326 |
| 6,334,786 | B1 | * | 1/2002 | Lee ............................ 439/331 |
| 6,468,101 | B2 | * | 10/2002 | Suzuki ....................... 439/326 |
| 6,520,805 | B2 | * | 2/2003 | Hassanzadeh et al. ...... 439/633 |
| 6,715,678 | B1 | * | 4/2004 | Sion et al. .................. 235/441 |
| 6,869,302 | B2 | * | 3/2005 | Bricaud et al. ............. 439/326 |
| 2003/0178486 | A1 | * | 9/2003 | Teng et al. ................. 235/441 |

FOREIGN PATENT DOCUMENTS

FR 2793575 A1 11/2000

OTHER PUBLICATIONS

ISA/EP: "PCT International Search Report" International Application No. PCT/IB03/04479 Feb. 11, 2004, p. 2.

* cited by examiner

*Primary Examiner*—Steven S. Paik
*Assistant Examiner*—Tuyen Kim Vo
(74) *Attorney, Agent, or Firm*—Osha Liang LLP

(57) ABSTRACT

A portable reader is arranged to read a card. The card is provided with a set of contact areas. The reader is provided with a connector. The connector is provided with a set of contact pads. The portable reader comprises a first and a second holding elements arranged to hold the card so that at least one contact pad of the set contact pads can be connected to at least one contact area of the set of contact areas. At least the one of the holding elements is arranged to be movable.

12 Claims, 5 Drawing Sheets

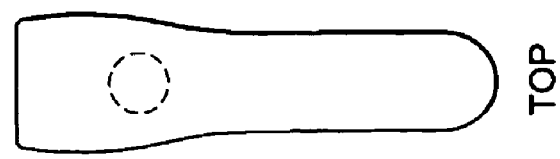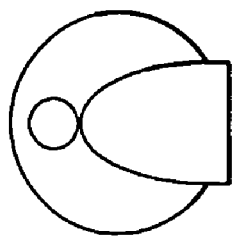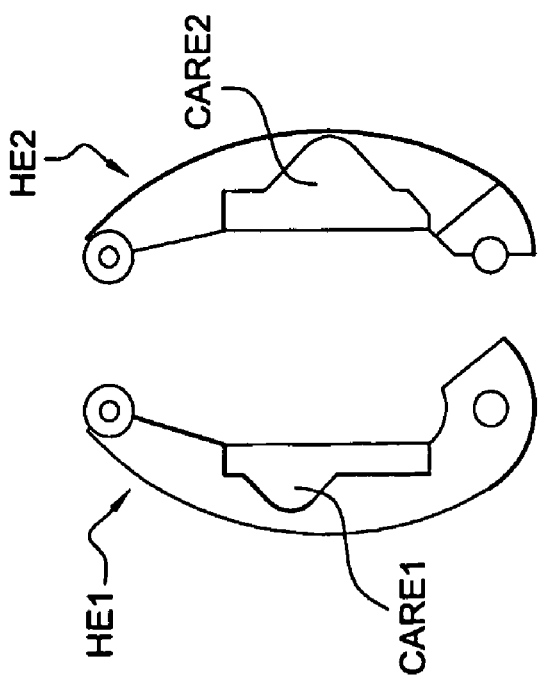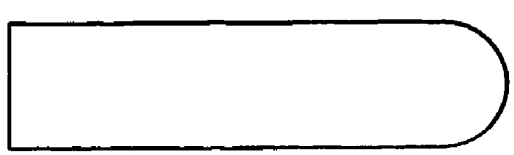

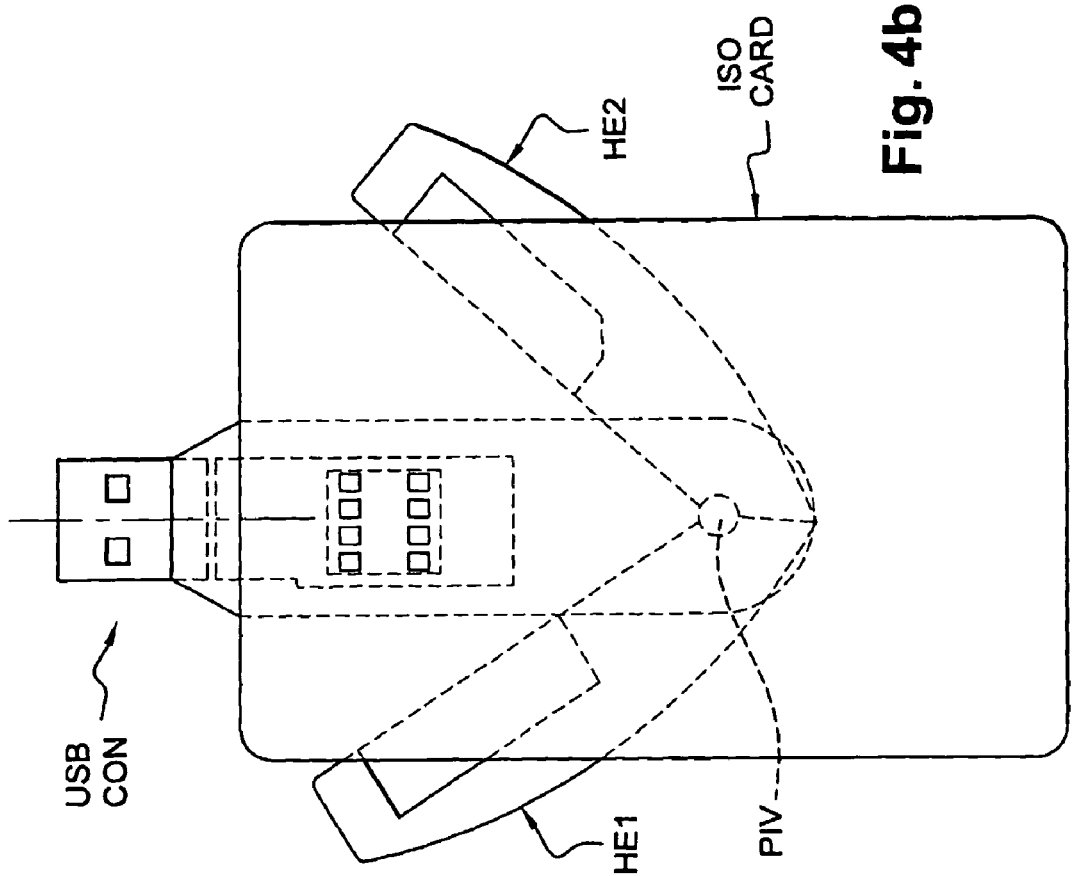
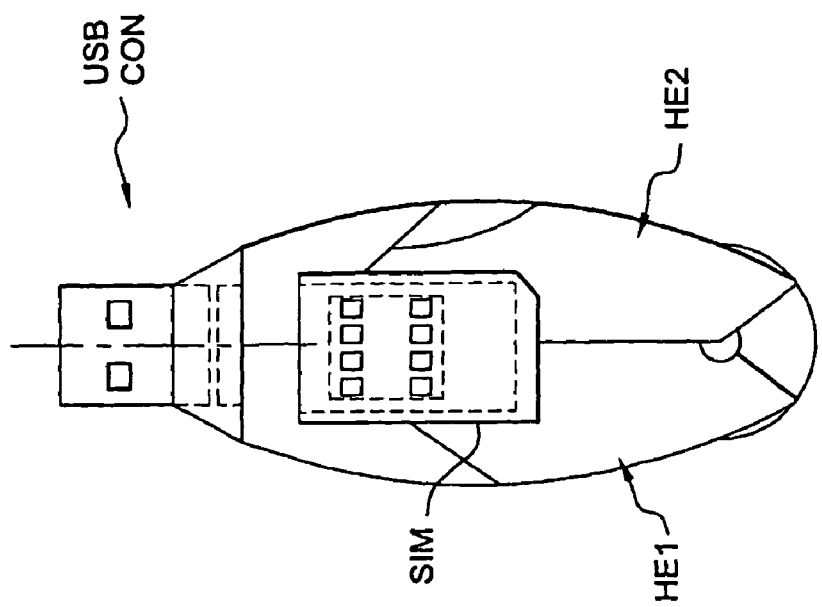

PORTABLE READER

FIELD OF THE INVENTION

The invention concerns a portable reader, in particular a portable reader arranged to read cards. The card can be, for example, a Subscriber Identity Module (SIM) card or an ISO card the format of which respect that specified in the ISO 7816 standard. More generally the card can be any portable object provided with an integrated circuit.

BACKGROUND OF THE INVENTION

EP1181663 A1 discloses a portable reader. The reader comprises a part for electric connection to the port of a computer, whereby said part exhibits four conduction lines in addition to a part for the insertion of a module which is removable and which can store confidential information, comprising the body of a plastic module which is substantially parallelepiped and rectangular whereby the dimensions thereof are 25 mm long, 15 mm wide and 0.76 mm thick, further comprising an integrated circuit chip provided with contact pads which are electrically connected to contact pads which are flush with one of the surfaces of said module, whereby the insertion part comprises a connector which has pins which are electrically connected to the electric connection lines of the reader and, when the module is inserted into said reader, to the contact pads of said module. The portable reader is specifically designed for readers, which are to be connected electrically to a USB port in a computer.

SUMMARY OF THE INVENTION

An object of the invention is to propose another solution.

According to one aspect of the invention a portable reader arranged to read a card, the card being provided with a set of contact areas, the reader being provided with a connector, the connector being provided with a set of contact pads, wherein the portable reader comprises a first and a second holding element arranged to hold the card so that at least one contact pad of the set of contact pads can be connected to at least one contact area of the set of contact areas, and wherein at least one holding element is movable.

With the portable reader of the prior art, when the contact areas of the card are connected to the contact pads of the connector, the card is maintained by means of the insertion part. With the invention, when the contact areas of the card to be read are positioned on the connector, the card is maintained using the first and second holding elements.

BRIEF DESCRIPTION OF THE DRAWINGS

FIGS. 2a-2e illustrates the various elements of the portable reader;

FIGS. 4a-4b illustrates a portable reader in two different embodiments;

DETAILED DESCRIPTION

Figure 1:
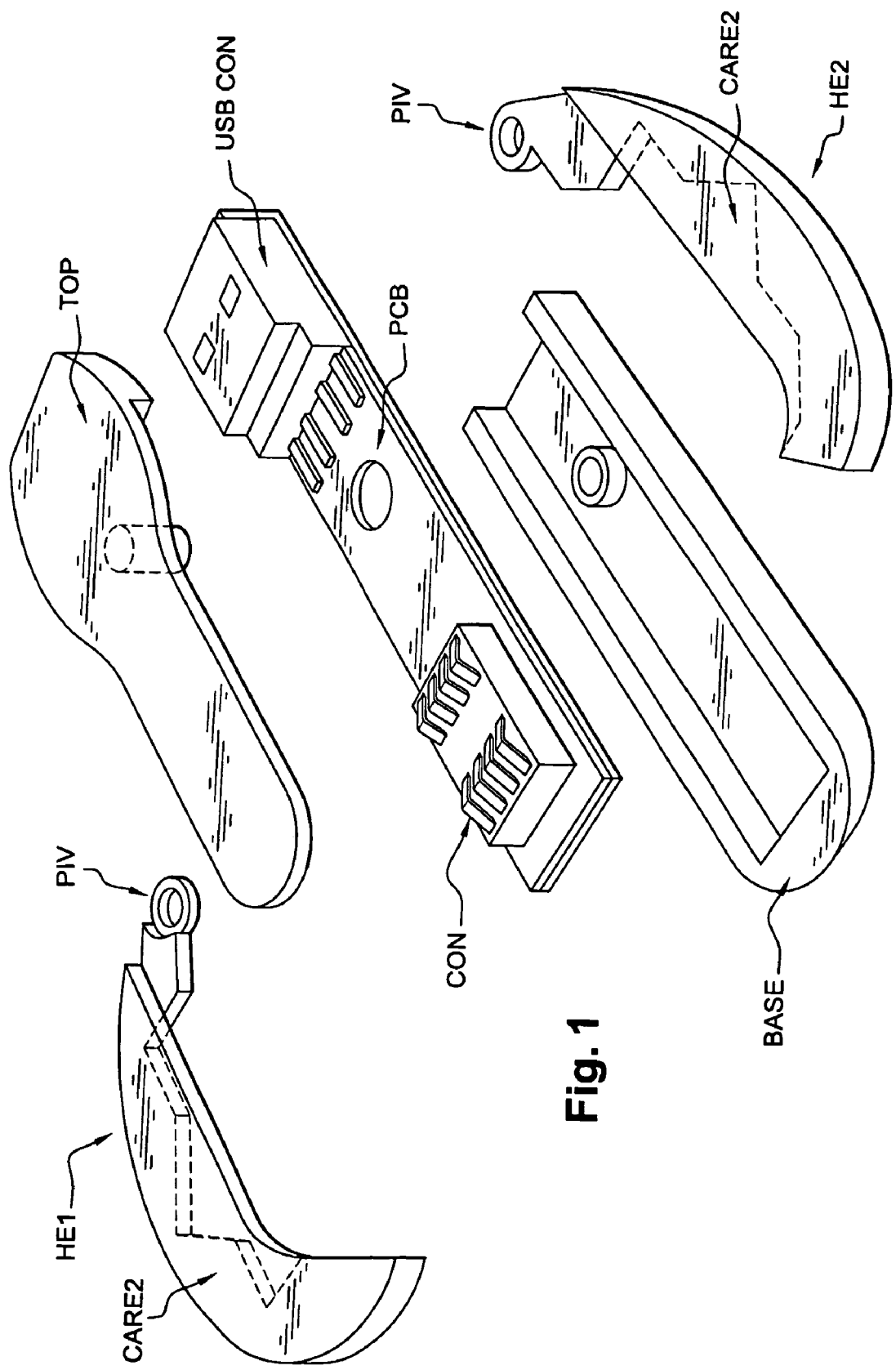
FIG. 1 is an exploded view of a portable reader.

FIG. 1 shows an exploded view of a portable reader arranged to read cards, in particular smart cards.

Smart cards are standardized articles described in particular in ISO standard 7816. Smart cards are generally provided with an integrated circuit. The integrated circuit may comprise various functional elements, such as in particular a central processor unit (CPU) and volatile memory (RAM), non-volatile memory (ROM) and electrically erasable and programmable non-volatile memory (EEPROM). The central unit (CPU) manages data and addresses in the various memories by means of a bus. In general, data and addresses are respectively encoded on 8 bits and on 16 bits. The integrated circuits are provided with six contact pads (not shown). As defined by the standard, the aforementioned pads include the following: a VCC pad, a GND pad, a VPP pad, a RST pad, a CLK pad, and an I/O pad. They serve respectively to supply the integrated circuit with electricity, to ground it, to supply it with a programming voltage, to reset it, to input a clock signal, and to perform data input and output. These pads are electrically connected to contact areas that are flush with the surface of the card. As defined by the standard, the aforementioned pads are configured such that they can connect with corresponding areas on the smart card (i.e. C1-C3 and C5-C7) (not shown). The aforementioned areas on the smart card are defined by the standard. More specifically, the VCC pad is configured to connect to an area C1, the GND pad is configured connect to an area C5, the VPP pad is configured to connect to an area C6, the RST pad is configured to connect to an area C2, the CLK pad is configured to connect to an area C3, and the I/O pad is configured to connect to an area C7. Part 2 of above-specified ISO standard 7816 relates to the number, size, and positioning of the electric contact areas on the card. Thus, as defined in that standard, in addition to the areas C1, C5, C6, C2, C3, and C7, the card also has two areas C4 and C8 that are reserved for future use.

The card reader comprises a base element (BASE) on which is fixed a pcb element (PCB). A first holding element (HE1) and a second holding element (HE2) are fixed to the pcb element (PCB). A top element (TOP) covers the pcb element (PCB).

The base element (BASE) and the top element (TOP) are made, for example, in a plastic material. The pcb element (PCB) comprises a support layer onto which is fixed a connector (CON) provided with 8 contact pads. The pcb element (PCB) further comprises a Universal Serial Bus (USB) plug that can be inserted in a USB port of a computer. The USB plug is provided with four conducting lines VCC, GND, D+, D−. These four conducting lines are electrically connected to the connector.

The first holding element (HE1) and the second holding element (HE2) are arranged to pivot using, for example, a pivot element (PIV). The first and second holding elements are provided with a first and a second card-receiving element (CARE1, CARE2). The first and second card-receiving elements are arranged in such a manner that when a card is inserted in the reader, the contact areas of the cards are connected to those of the connector and that the conducting lines VCC, GND, D+, D− are respectively electrically connected to the contact areas C1, C2, C4 and C8 of the card.

Advantageously, as illustrated in FIG. 2, the first and second card-receiving elements (CARE1, CARE2) are arranged to receive cards having various formats, for example, both a SIM card and an ISO card. The first and second card-receiving elements (CARE1, CARE2) can be manufactured using, for example, molding techniques.

Figure 3B:
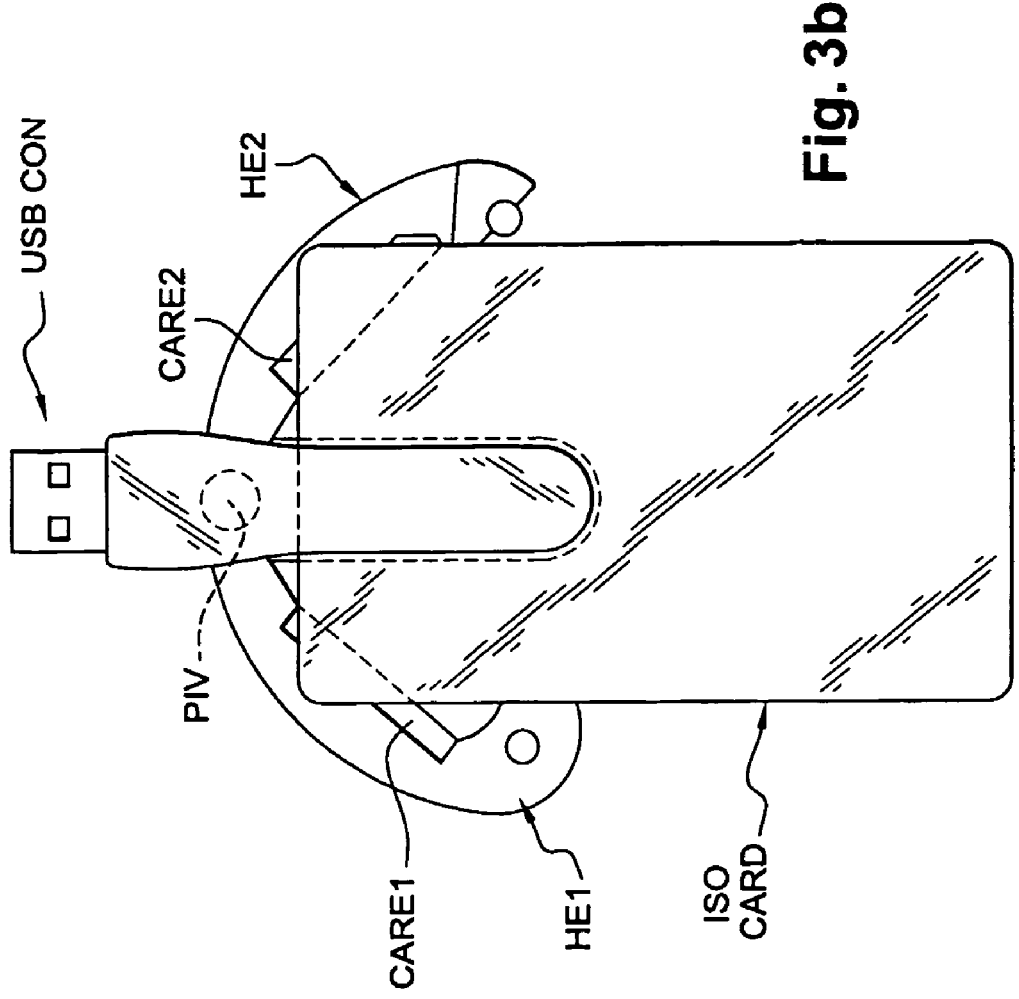
FIGS. 3a-3b illustrates a portable reader in two different embodiments.
Figure 3A:
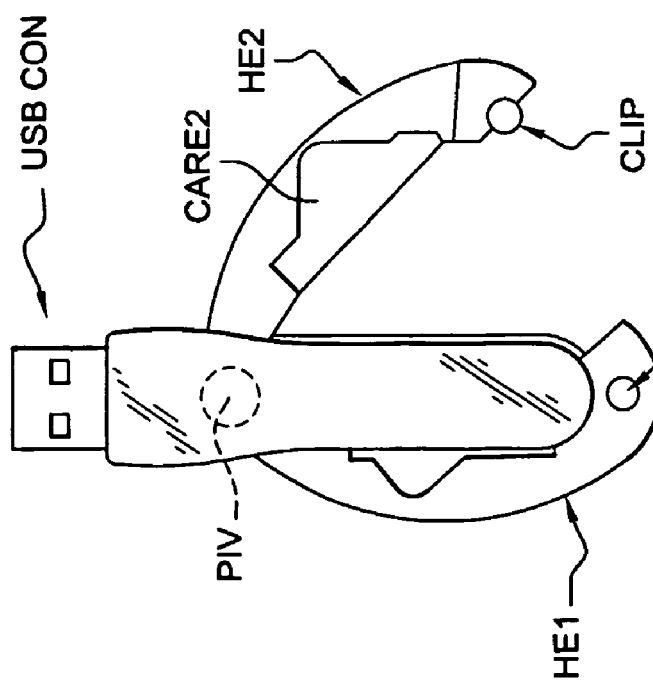

FIG. 3 illustrates a first holding element in a closed position and a second holding element in an open position.

The first and second holding elements can be provided with clipping elements (CLIP) so that they can be dipped to each other when they both are in a closed position.

The above-mentioned description illustrates a portable reader arranged to read a card. The card is provided with a set of contact areas. The reader is provided with a connector. The connector is provided with a set of contact pads. The portable reader comprises a first and a second holding element arranged to hold the card so that at least one contact pad of the set of contact pads can be connected to at least one contact area of the set of contact areas. At least one holding element is movable.

According to another aspect of the invention, the first and the second holding element (HE1, HE2) are respectively provided with a first and a second card-receiving elements (CARE1, CARE2).

According to another aspect of the invention, the first and the second card-receiving elements (CARE1, CARE2) are arranged to receive cards having various format.

According to another aspect of the invention, the first and the second card-receiving elements (CARE1, CARE2) are arranged to receive both a SIM card and an ISO card.

According to another aspect of the invention, the first and the second holding elements (HE1, HE2) are arranged to pivot.

According to another aspect of the invention, the portable reader further comprises a USB connector (USB CON).

According to another aspect of the invention, the USB connector is arranged to pivot. Thus, when connecting the portable reader to a USB computer port, the portable reader can be placed either in a substantially vertical position, or in a substantially horizontal position.

In the above-mentioned description, for example, as illustrated in FIG. 3, the pivot element (PIV) is placed near the USB connector. Alternatively, as shown in FIG. 4, the pivot element (PIV) can be placed at the other extremity of the pcb support.

Figure 5B:
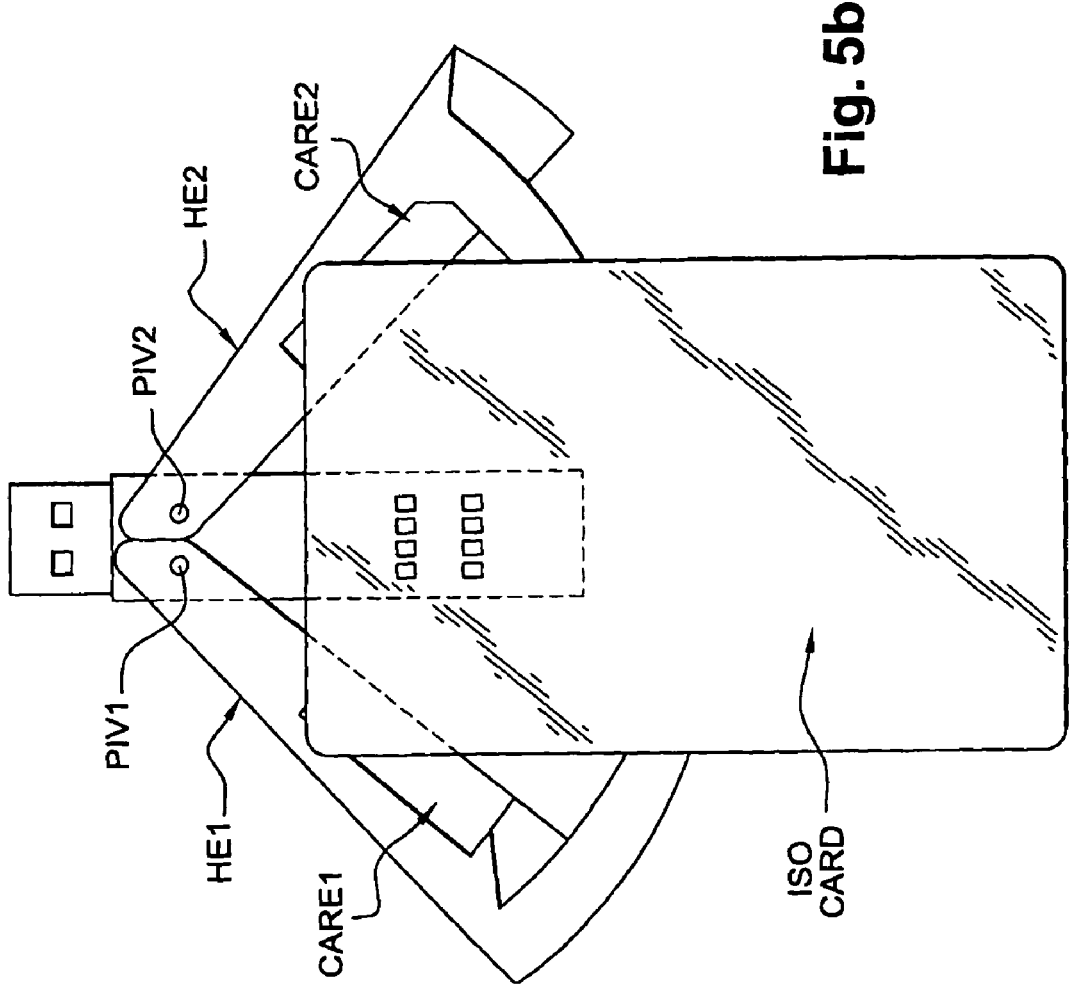
FIGS. 5a-5b illustrates a portable reader in two different embodiments.
Figure 5A:
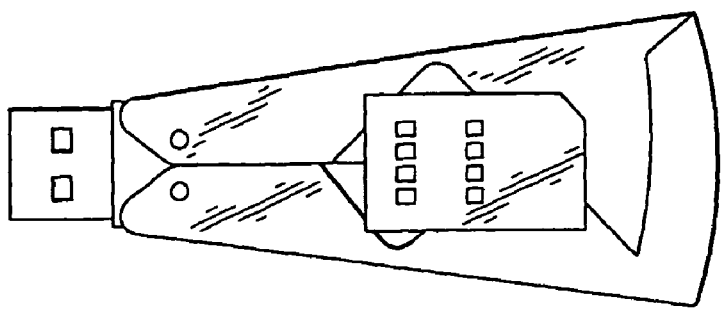

In the above-mentioned description, the first and second holding elements (HE1, HE2) were fixed to one pivot element (PIV). Alternatively, as illustrated in FIG. 5, each holding element can be fixed to a separate pivot (PIV1, PIV2).

In the above-mentioned description, a USB connector is used. More generally any other type of connector could be used like, for example, a PCMCIA or serial port. Having a USB connector is not essential to the invention.

In the above-mentioned description, two holding elements are used, but there can be three or more.

The invention claimed is:

1. A portable reader for reading a card having a plurality of contact areas, comprising:
    a connector having a plurality of contact pads; and
    a first holding element and a second holding element arranged to hold the card such that at least one contact pad of the plurality of contact pads can be connected to at least one contact area of the plurality of contact areas,
    wherein at least one of the first holding element and the second holding element is movable in a lateral direction.

2. The portable reader according to claim 1, wherein the first holding element and the second holding element are respectively provided with a first card-receiving element and a second card-receiving element.

3. The portable reader according to claim 2, wherein the first card-receiving element and the second card-receiving element are arranged to receive any of cards corresponding to various formats.

4. The portable reader according to claim 3, wherein the first card-receiving element and the second card-receiving element are arranged to receive at least one selected from the group consisting of a SIM card and an ISO card.

5. The portable reader according to claim 1, wherein the first holding element and the second holding element are each arranged to pivot laterally.

6. The portable reader according to claim 1, wherein the portable reader further comprises a USB connector.

7. The portable reader according to claim 6, wherein the USB connector is arranged to pivot.

8. The portable reader according to claim 1, wherein the first holding element and the second holding element are movable in substantially opposite directions.

9. The portable reader according to claim 1, further comprising:
    a stationary base;
    a stationary top; and
    a support layer comprising the connector having the plurality of contact pads, wherein the support layer is disposed between the stationary base and the stationary top;
    wherein the first and the second holding element are disposed between the support layer and the stationary top.

10. The portable reader according to claim 9, wherein the connector is a USB connector.

11. The portable reader according to claim 10, wherein the USB connector is arranged to pivot.

12. A portable reader for reading a card, comprising:
    a housing having a pivot portion;
    a connector having a contact pad disposed within the housing; and
    a first holding element configured to be supported pivotally by the pivot portion and be pivoted in a lateral direction,
    wherein the first holding element is configured to hold the card such that the contact pad can be connected to a contact area of the card.

* * * * *